United States Patent [19]

Mullins, Jr.

[11] 3,744,076

[45] July 10, 1973

[54] AUTOMATIC SHOE POLISHING MACHINE

[76] Inventor: James N. Mullins, Jr., P.O. Box 4398, Fort Worth, Tex.

[22] Filed: Apr. 26, 1971

[21] Appl. No.: 137,337

[52] U.S. Cl. .................................. 15/31, 15/32
[51] Int. Cl. ................................... A47l 23/02
[58] Field of Search ................ 15/30–32, 34, 97 A

[56] References Cited
UNITED STATES PATENTS

| 879,541 | 2/1908 | Hammond | 15/32 |
| 1,196,659 | 8/1916 | Burkhart | 15/32 |
| 1,448,342 | 3/1923 | Harris | 15/32 |
| 1,535,738 | 4/1925 | Raysor | 15/32 |
| 3,365,741 | 1/1968 | Smagula | 15/31 |

*Primary Examiner*—Edward L. Roberts
*Attorney*—Hyer, Eickenroht, Thompson & Turner

[57] ABSTRACT

An automatic shoe polishing machine is provided for polishing a shoe. The shoe, while on the foot of the wearer, is placed on a shoe support in an opening in the machine housing. Rotating side polish application brushes pick up polish from a dispenser and move along the sides of a shoe applying polish to the shoe. Rotating side buffing brushes follow the applicator brushes. After applying the polish, the applicator brushes move out of contact with the shoe so they will not contact the shoe as the are returned to their starting position. A brush applies polish to the toe of the shoe after which another brush buffs the toe. The movement of the brushes is coordinated by having the movement of the two toe brushes controlled by movement of the side brushes. The applicator brushes pick up polish from cavities in a polish dispensing body just before they move into contact with the shoe. The cavities are closed except when dispensing polish to keep the polish from being exposed to the drying effect of the air when the machine is not in operation.

23 Claims, 20 Drawing Figures

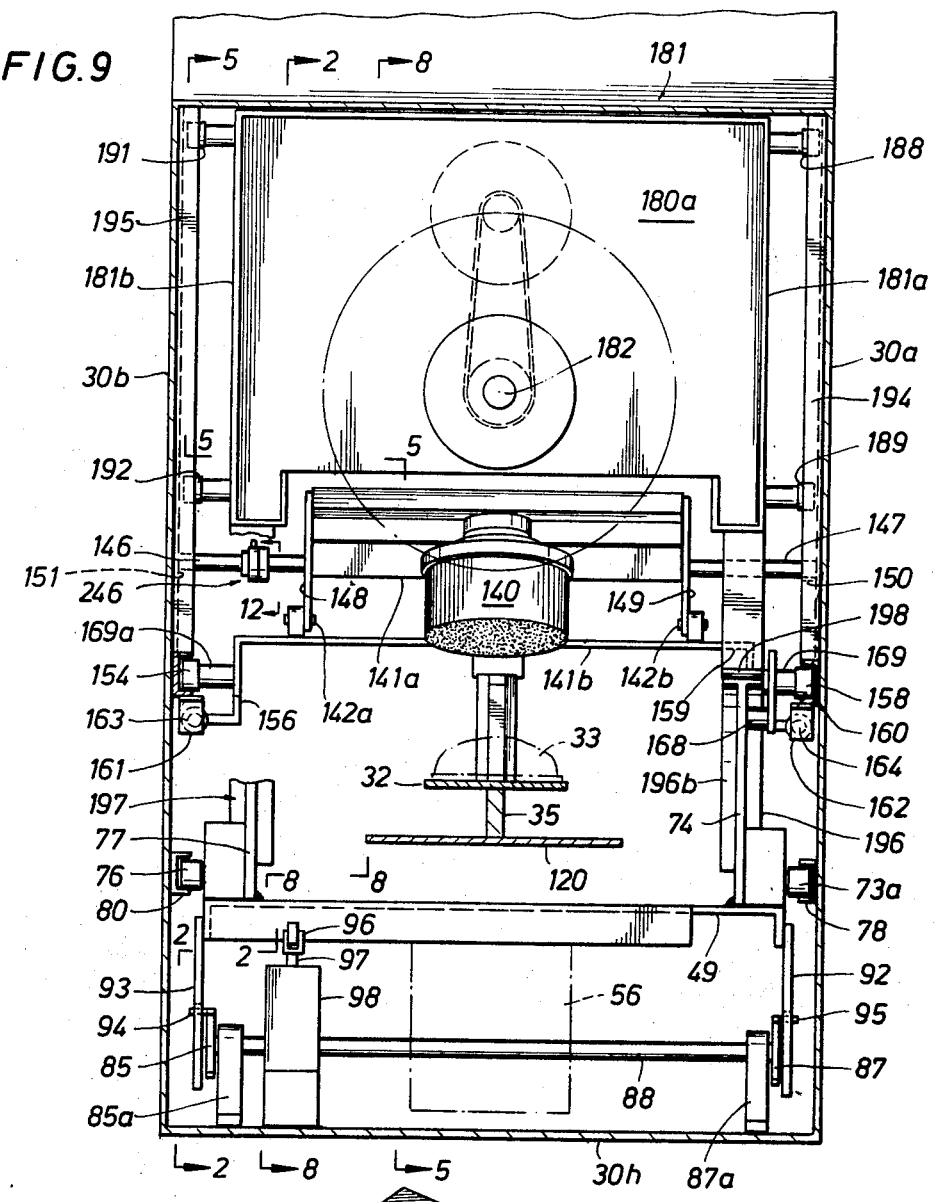
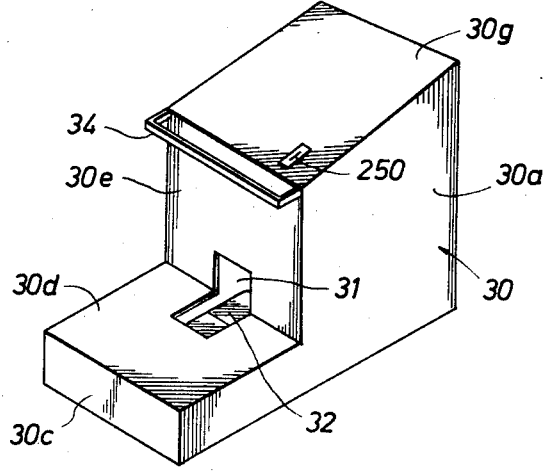

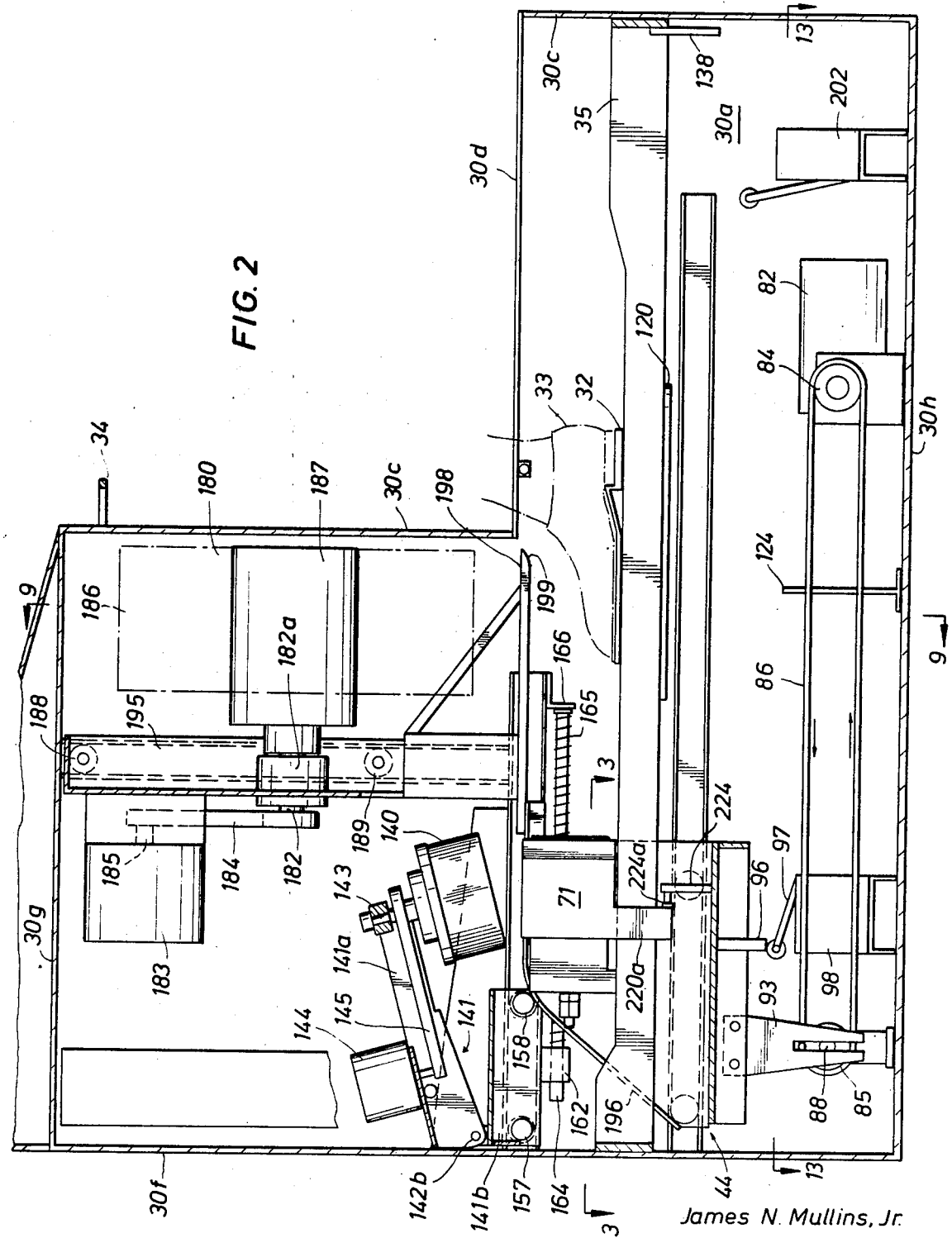

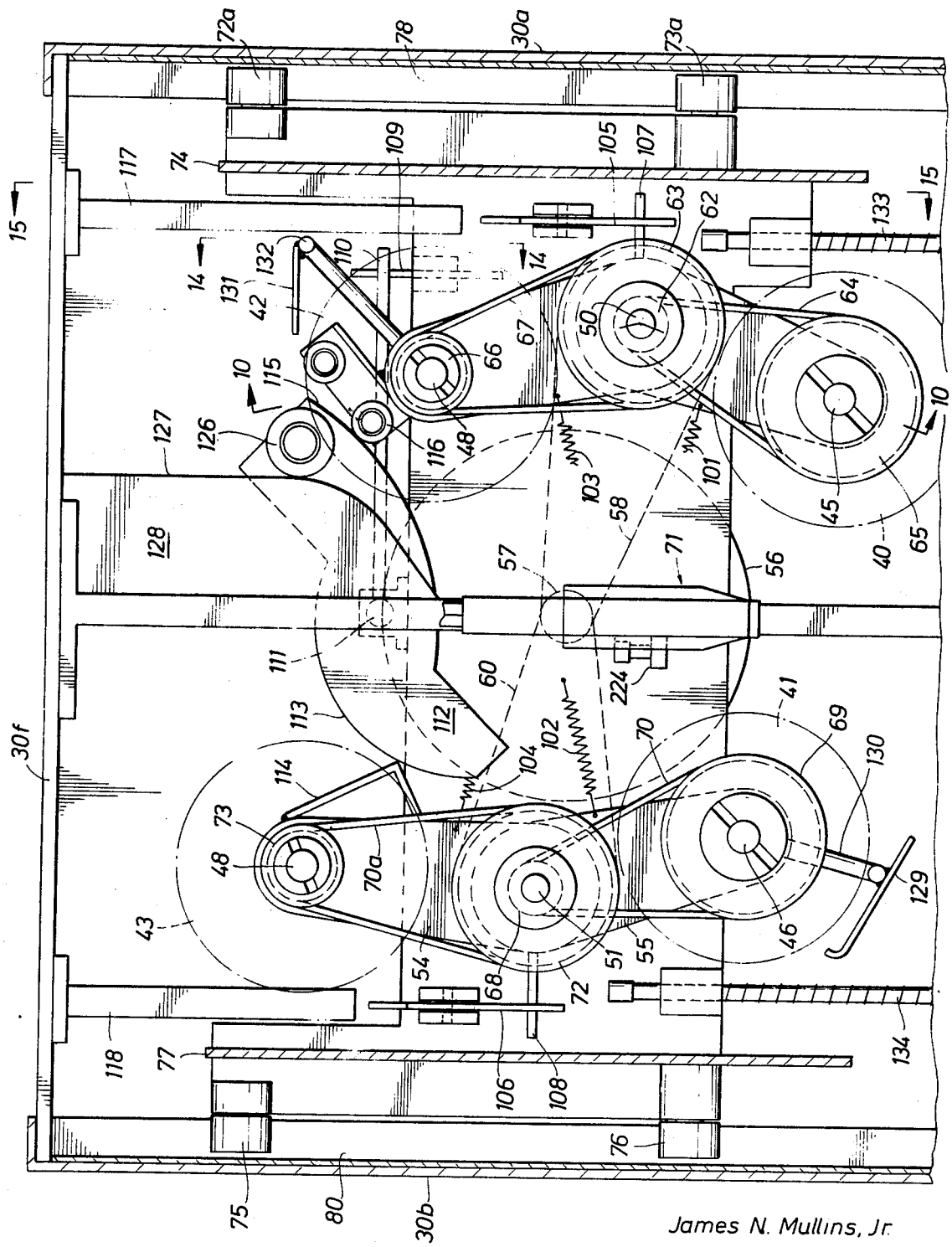

James N. Mullins, Jr.
INVENTOR

BY Hyer, Eickenroht,
Thompson & Turner

ATTORNEYS

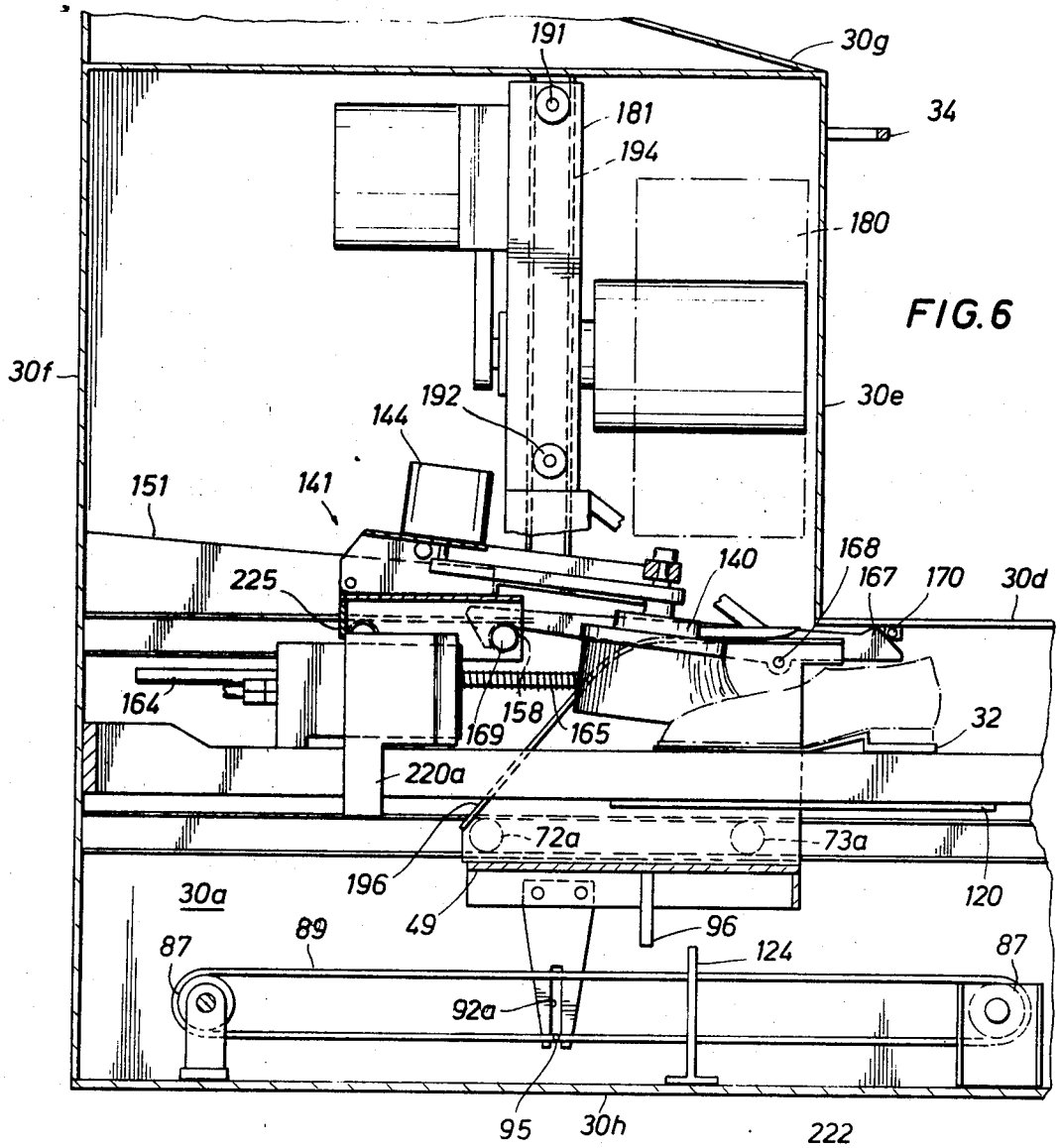
FIG. 6
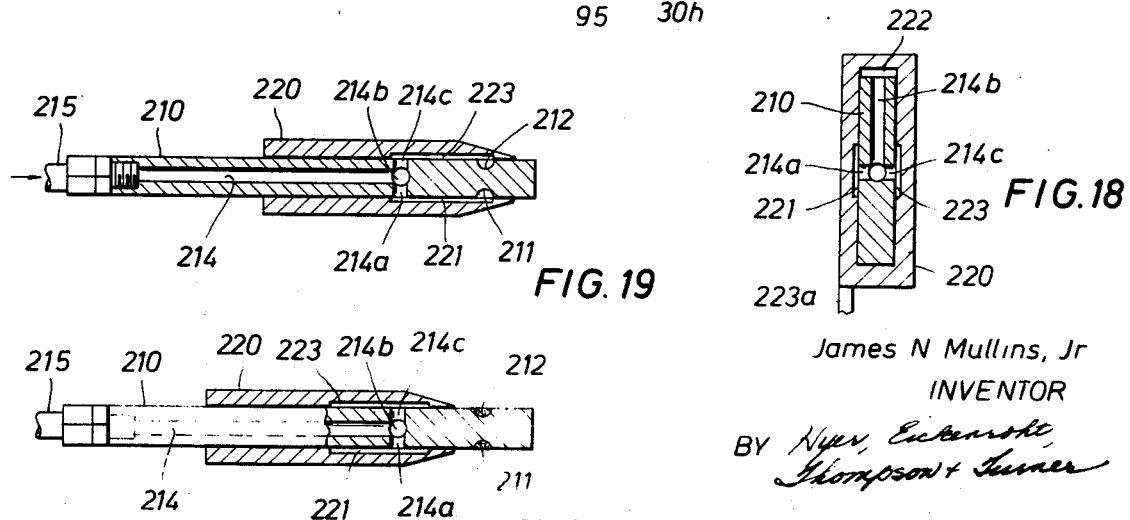
FIG. 19
FIG. 18
FIG. 20
James N Mullins, Jr
INVENTOR
BY Hyer, Eckenrode,
Thompson + Turner
ATTORNEYS

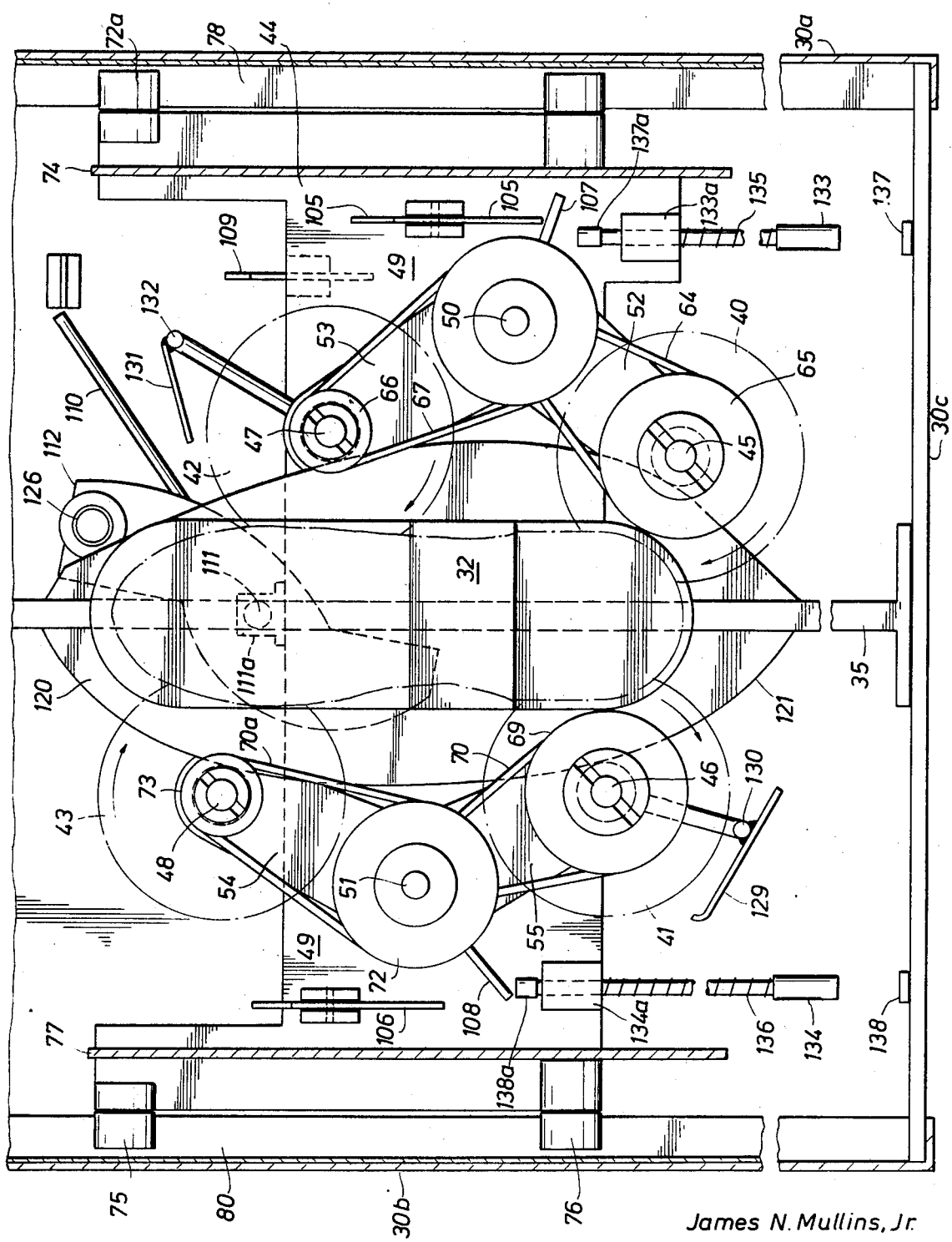

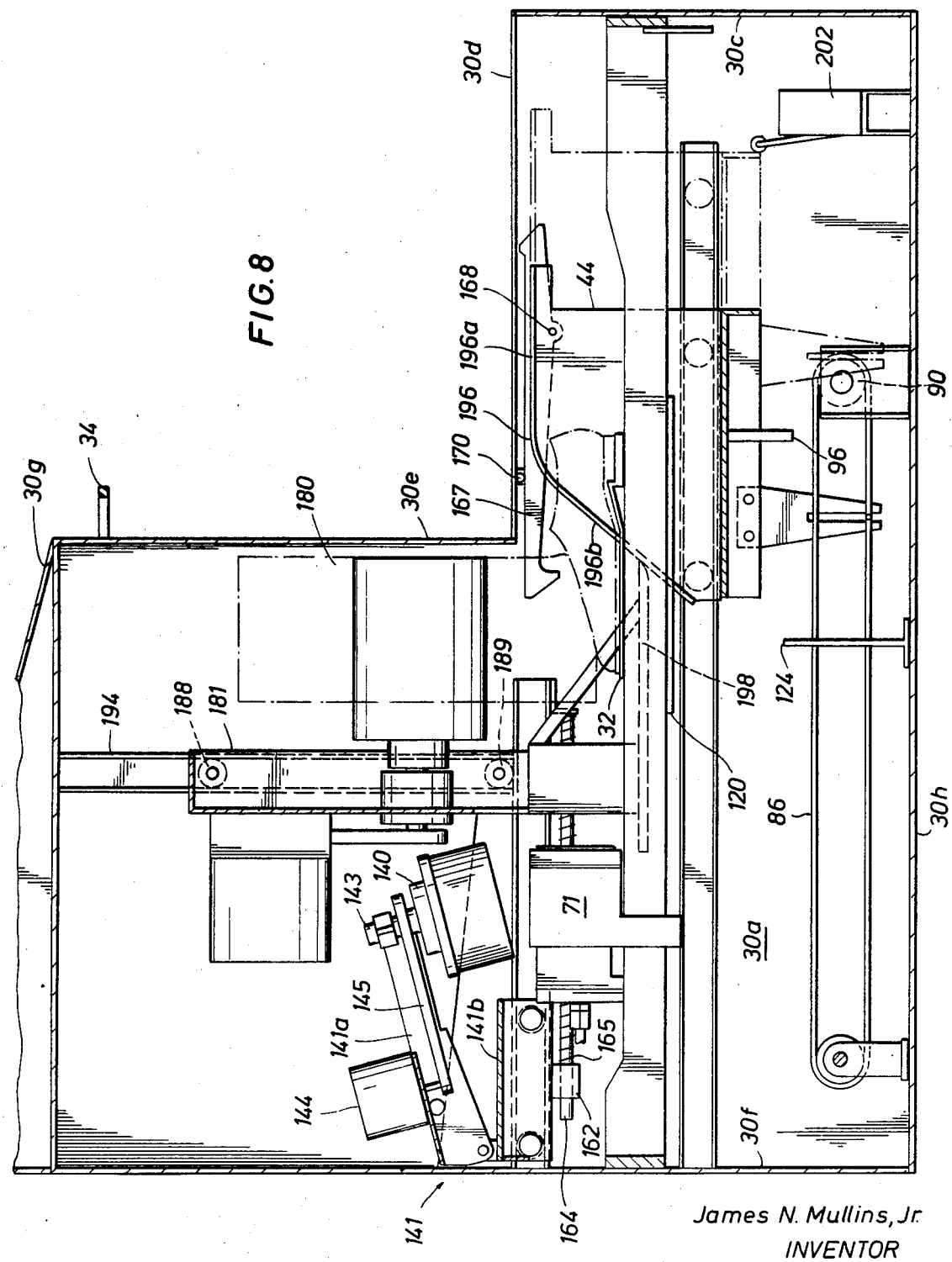

James N. Mullins, Jr.
INVENTOR

ATTORNEYS

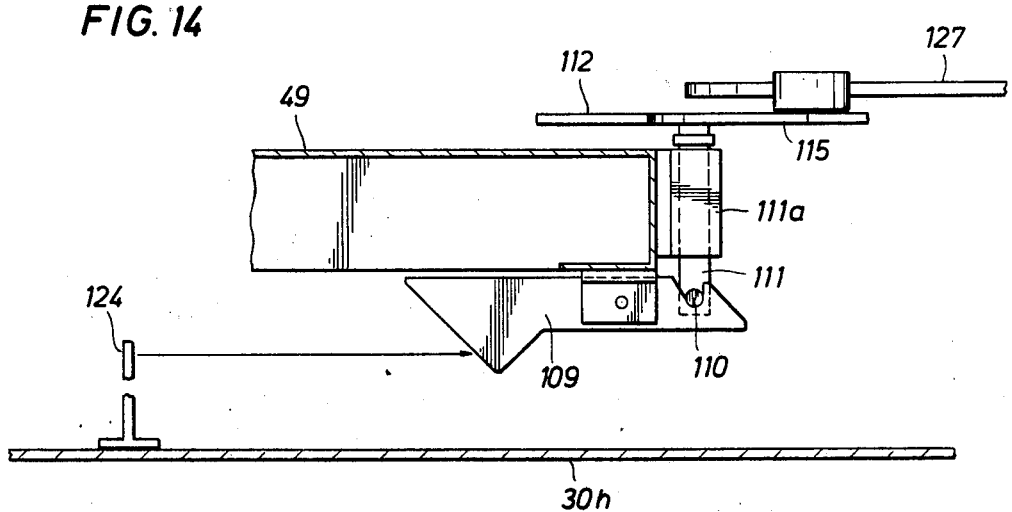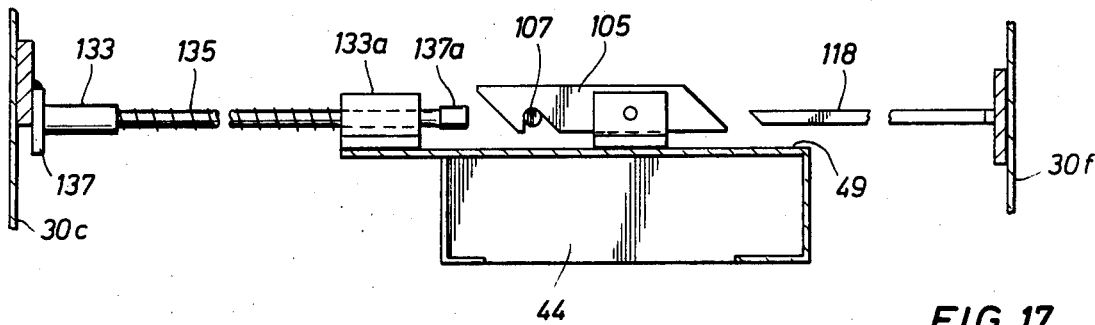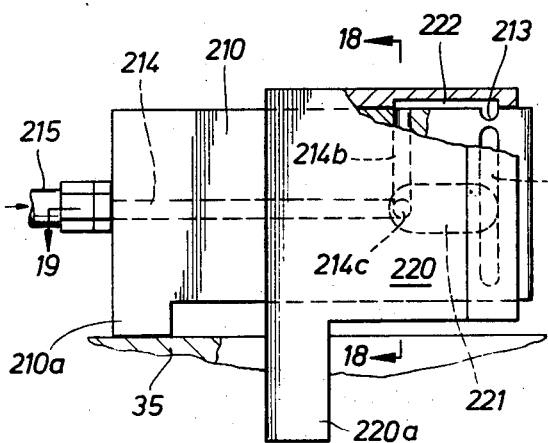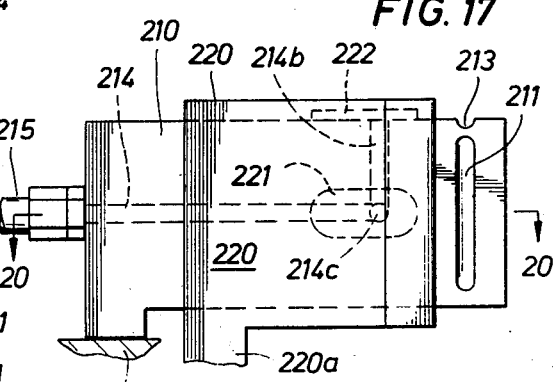

AUTOMATIC SHOE POLISHING MACHINE

This invention relates to an automatic shoe polishing machine, and in particular to an automatic shoe polishing machine for polishing a shoe while on the foot of the wearer.

Generally, the polishing of a shoe includes the two steps of applying polish to the shoe and buffing or brushing the polish-coated surfaces of the shoe. In the past, polish has been applied in two ways. One is to spray a liquified polish onto the shoe. The other is to transfer polish from a dispenser to an applicator brush or the like, which applies the polish to the shoe. In automatic shoe polishing machines of the type to which this invention relates, the user will be wearing the shoe as it is polished. Where the polish is sprayed, it is difficult, if not impossible, to keep from getting some of the polish on the socks or stockings of the shoe wearer. Also, some of the sprayed polish will fall on the various parts of the mechanism and increase the maintenance problems of the machine.

Using applicators, such as brushes, to transfer polish to the shoe decreases substantially the likelihood of getting polish on the socks or stockings of the user of the machine or on the machine itself. This complicates the buffing step, however, since it is preferred to use separate brushes or buffing cloths to produce a shine on the shoe and the applicator brushes have to be moved out of the way of the shoe so that they will not touch the shoe after the buffing brushes begin polishing the shoe.

A further problem with using brushes to apply polish to the shoe is storing the polish. Machines of the type to which this invention relates are usually located in public places, such as train depots and air and bus terminals. They are usually coin operated and therefore unattended except for periodic calls by a serviceman to collect the money deposited and to service the machine. This means that the shoe polish in the machine must stay moist and usable for a substantial period of time.

It is an object of this invention to provide an automatic shoe polishing machine that applies polish to and buffs a shoe with separate brushes that are so mounted and moved into and out of engagement with a shoe that each brush will perform its function in the proper sequence.

It is another object of this invention to provide an automatic shoe polishing machine that applies polish to a shoe with brushes and that coordinates the movement of the various applicator brushes and buffing brushes by having three different brush carrying carriages, with the movement of two of the carriages being controlled by the movement of the other carriage to insure that each brush performs its function in the proper sequence.

It is another object of this invention to provide an automatic shoeshine machine that will operate for long periods without substantial maintenance.

It is another object of this invention to provide a simple and reliable mechanism for moving the brushes for applying polish and for buffing into and out of engagement with the shoe.

It is another object of this invention to provide an automatic shoe polishing machine that includes a separate brush to apply polish to the toe of the shoe and a separate brush to buff the toe of the shoe with the movements of these brushes into and out of engagement with the toe of the shoe being controlled by the position of the brushes used to apply polish to and to buff the sides of the shoe to thereby coordinate the movement of all brushes.

It is another object of this invention to provide an automatic shoe polishing machine having brushes that apply polish and buff across the toe of the shoe so that the low areas between the wrinkles in the shoe toe receive polish and are buffed.

It is another object of this invention to provide an automatic shoe polishing machine that will maintain a supply of polish in a moist, paste-like, usable condition for a period of time that is normally a longer period than is required to use it up.

It is another object of this invention to provide an automatic shoe polishing machine that exposes to the air only the volume of polish to be supplied to the applicator brushes with such exposure occurring after the machine has started an operating cycle so that the polish to be picked up is exposed for a minimum length of time before being applied to a shoe.

It is yet another object of this invention to provide an automatic shoe polishing machine in which a substantially constant volume of polish is picked up by each applicator brush for transfer to each shoe that is polished with the volume exposed to be picked up isolated from the remaining supply of polish in the machine so that the remaining supply of polish is not exposed to the air.

These and other objects, advantages, and features of this invention will be apparent to those skilled in the art from a consideration of this specification, including the attached drawings and appended claims.

The invention will now be described in detail in connection with the attached drawings in which:

FIG. 1 is a perspective view of the preferred embodiment of the automatic shoe polishing machine of this invention;

FIG. 2 is a sectional view of the machine of FIG. 1 taken along line 2—2 of FIG. 9 with the machine in its starting position;

FIG. 3 is a sectional view of the shoe polisher taken along line 3—3 of FIG. 2;

FIG. 6 is a sectional view similar to FIG. 5 showing the toe applicator brush applying polish to the shoe toe;

FIG. 7 is a sectional view similar to FIG. 3 showing the side buffing brushes shining the sides of the shoe while the side applicator brushes apply polish to the side of the shoe ahead of the buffing brushes;

FIG. 8 is a sectional view taken along line 8—8 of FIG. 9 showing the toe buffing brush buffing the toe of a shoe;

FIG. 9 is a view taken along line 9—9 of FIG. 2;

FIG. 14 is a sectional view taken along line 14—14 of FIG. 3, showing only the latches for holding the side buffing brushes away from the polish dispenser while the side applicator brushes pick up polish;

FIG. 15 is a sectional view taken along line 15—15 of FIG. 3, showing only the latches for holding the side polish applicator brushes out of engagement with the shoe as these brushes are returned to their starting position;

FIG. 16 is a side view partly in section and partly in elevation of the polish dispenser of the machine of FIG. 1 in the closed position;

FIG. 17 is a side view in elevation of the polish dispenser of FIG. 16 in the open position;

FIG. 18 is a sectional view taken along line 18—18 of FIG. 16;

FIG. 19 is a sectional view taken along line 19—19 of FIG. 16; and

FIG. 20 is a sectional view taken along line 20—20 of FIG. 17.

Figure 4:
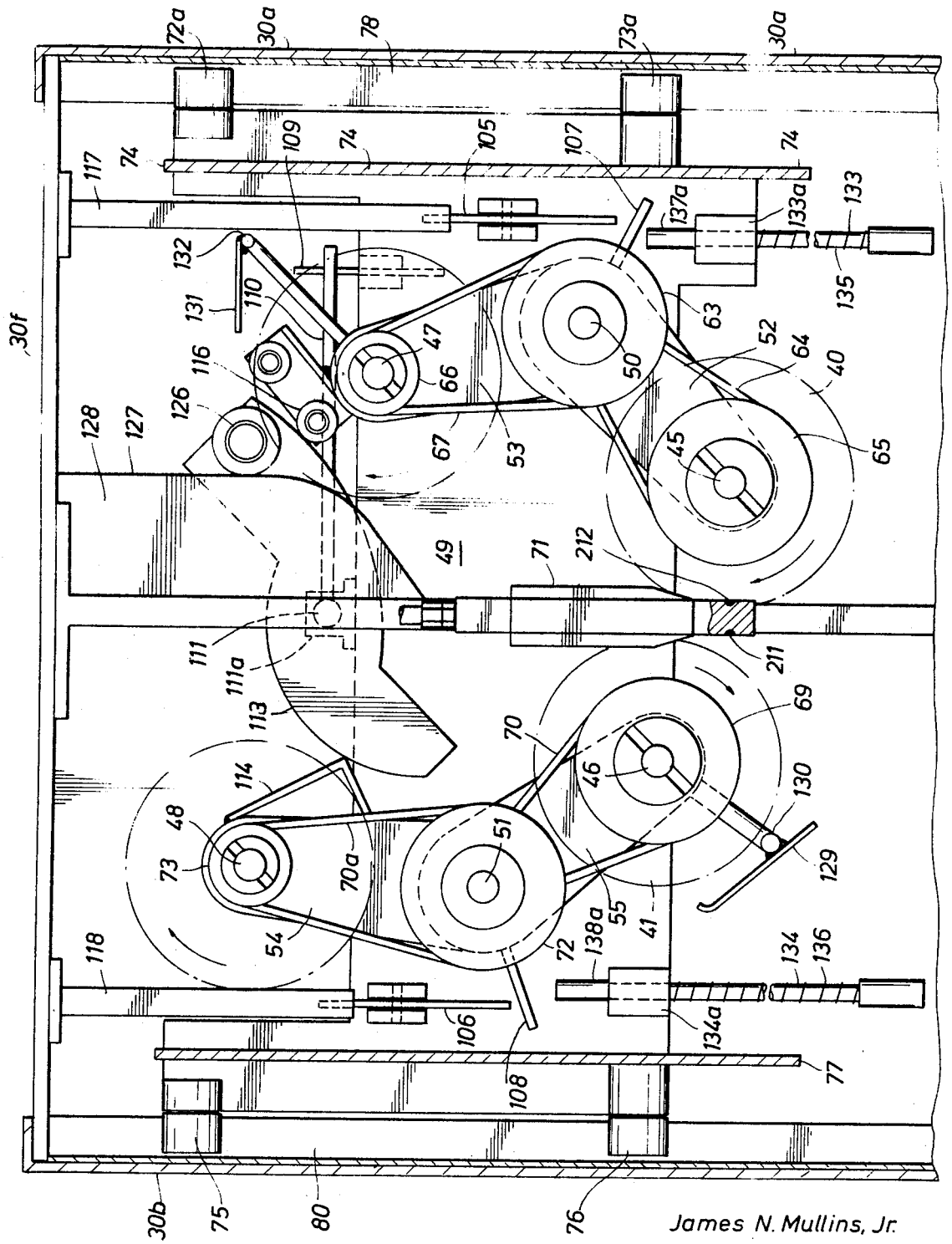
FIG. 4 is a sectional view similar to FIG. 3 with the side polish applicator brushes in position to pick up polish from the polish supply means.

The preferred embodiment of the automatic shoe polishing machine of this invention is located in housing 30, as shown in FIG. 1. The housing includes spaced, parallel side walls 30a and 30b (FIG. 9). The forward portion of the side walls are of reduced height and combine with front end wall 30c to support plate 30d and provide a relatively low platform upon which a user of the machine can stand. The rear portion of the side walls combine with front panel 30e, back panel 30f (FIG. 2), and top panel 30g to complete the housing. Top panel 30g is inclined toward the rear of the housing so that printed operating instructions on the top panel can be more easily read.

To use the machine, a person will place one shoe through opening 31 in plate 30d and front panel 30e onto shoe support 32. Handrail 34 is attached to the top of front panel 30e to allow a user of the machine to steady himself while getting his shoes shined. Shoe support 32 is mounted on center beam 35 which extends lengthwise of the housing between the center of front end wall 30c to the center of rear housing wall 30f. The shoe support is of conventional shape, having a raised portion to engage the heel of shoe 33 and limit its movement forward toward the front of the housing.

The machine includes brushes for applying polish to and for buffing the sides of a shoe on the shoe support. As best seen in FIGS. 3, 4, 7, and 10, brushes 40 and 41 are provided for applying polish to the sides of a shoe on support 32. Brushes 42 and 43 are provided to buff the sides of a shoe positioned on the support. Means are provided for mounting side brushes 40, 41, 42, and 43 for rotation and in position for an applicator brush and buffing brush to move along each side of shoe support 32 as the mounting means is moved parallel to the shoe support from a starting position and back again. All the side brushes in the embodiment shown are circular in cross section, having a central tubular hub with radially extending bristles attached thereto. To simplify the drawings, the bristles are not shown in detail. A broken circle is used to indicate the outward extent of the bristles. The side brush mounting means includes first or side carriage 44 and shafts 45, 46, 47, and 48, which support brushes 40, 41, 42, and 43, respectively, for rotation.

The carriage includes carriage bed 49 that extends generally horizontally between side walls 30a and 30b of the housing, and means are provided for mounting the side brushes and the shafts supporting the brushes on base plate 49 for lateral movement relative to shoe support 32. The lateral movement mounting means for brushes 40 and 42 will be described first. It includes shaft 50, which extends through carriage bed 49 and which is supported for rotation by suitable bearing in bearing housing 50a. Arms 52 and 53 are supported for rotation relative to shaft 50 also by bearings in bearing housing 50a. The arms are elongated flat plates that extend radially from shaft 50 generally parallel to carriage bed 49 of the first carriage. Shafts 45 and 47 are attached to arms 52 and 53, respectively, adjacent their outer ends. The shafts are generally perpendicular to the arms and substantially vertical. Brushes 40 and 42 are supported by the shafts at the proper height to brush the sides of a shoe as the brushes are moved horizontally by the shoe, while being movable laterally of the shoe by the pivotal motion of supporting arms 52 and 53. In a similar manner, shaft 51 is mounted for rotation on carriage bed 49 of the carriage. Arms 54 and 55 are pivotally mounted on shaft 51 and support brush shafts 48 and 46, respectively, for lateral movement relative to the shoe support.

The side brush mounting means includes means for rotating side brushes 40, 41, 42, and 43 on their supporting shafts so that the brushes will rotatingly apply polish to and buff the sides of a shoe as the brushes move along the sides of shoe support 32. In the embodiment shown (FIGS. 3 and 10), the rotating means includes electric motor 56, which is mounted to the underside of side carriage base plate 49. Sheave or pulley 57 (shown in broken lines) is mounted on the output shaft (not shown) of motor 56. Belt 58 connects driving pulley 57 to pulley 59 to rotate shaft 50. Similarly, belt 60 connects a driving pulley (not shown) mounted on the motor shaft and a driven pulley (not shown) which is mounted on shaft 51 to rotate the shaft.

Shafts 50 and 51, in turn, transmit the power of motor 56 to the brushes. Shaft 50 (FIG. 10) rotates pulleys 62 and 63 that are fixed to the shaft. These pulleys rotate pulleys 65 and 66, respectively, through belts 64 and 67. Pulleys 65 and 66 are mounted for rotation on shafts 45 and 47 by suitable bearings. Spacer bushings 65a and 66a are attached to the pulleys and support brushes 40 and 42, respectively, on their supporting shafts at the same elevation. The spacer bushings also provide a driving connection between the pulleys and the brushes. As shown, hubs 40a and 42a have keys 40b and 42b, respectively, that engage corresponding grooves in the spacer bushings.

As seen in FIG. 3, shaft 51 rotates brushes 41 and 43 through the same power train. The shaft rotates sheaves or pulleys 68 and 72. Pulley 68 drives pulley 69 and brush 41 through belt 70. Drive pulley 72 drives pulley 73 and brush 43 through belt 70a. Pulleys 69 and 73 are supported for rotation by appropriate bearings mounted on shafts 46 and 48, respectively, and drive the brushes in the same manner as described above in connection with brushes 40 and 42.

As best seen in FIG. 3, pulleys 63 and 72 have a diameter about double that of the pulleys they drive. The converse is true with pulleys 62 and 68 that drive the applicator brushes 40 and 41. Thus, the applicator brushes rotate about half as fast as do buffing brushes 42 and 43, which is preferred, since applicator brushes should rotate only fast enough to spread the polish evenly, whereas the buffing brush should do as much work as possible as it travels along the shoe.

Means are provided for moving the means mounting the side brushes 40, 41, 42, and 43 parallel to the shoe support from a starting position (FIG. 2) and back again for an applicator brush and a polishing brush to move along each side of said support and apply polish to and buff the sides of a shoe on said support. In the embodiment shown, the moving means first moves carriage 44 rearwardly from the starting position shown in FIGS. 2 and 3 toward polish supply means 71 where the applicator brushes 40 and 41 pick up polish in a manner to be described below. The moving means then moves carriage 44 forwardly toward the front of the housing past shoe support 32, where the brushes apply polish to and buff the sides of a shoe, and then rearwardly again to the starting point.

The brush moving means includes means mounting carriage 44 for movement relative to the housing in order to move the brushes along the side of shoe support 32. As shown in FIGS. 4, 5, 6, and 9, the mounting means includes rollers 72a and 73a, mounted on side 74 of side carriage 44, and rollers 75 and 76 mounted on side 77 of the side carriage. Rollers 72 and 73 ride in U-shaped channel or track 78 attached to housing wall 30a, while rollers 75 and 76 ride in track 80 on housing wall 30b. The tracks are parallel to each other and to the shoe support, generally.

Figure 5:
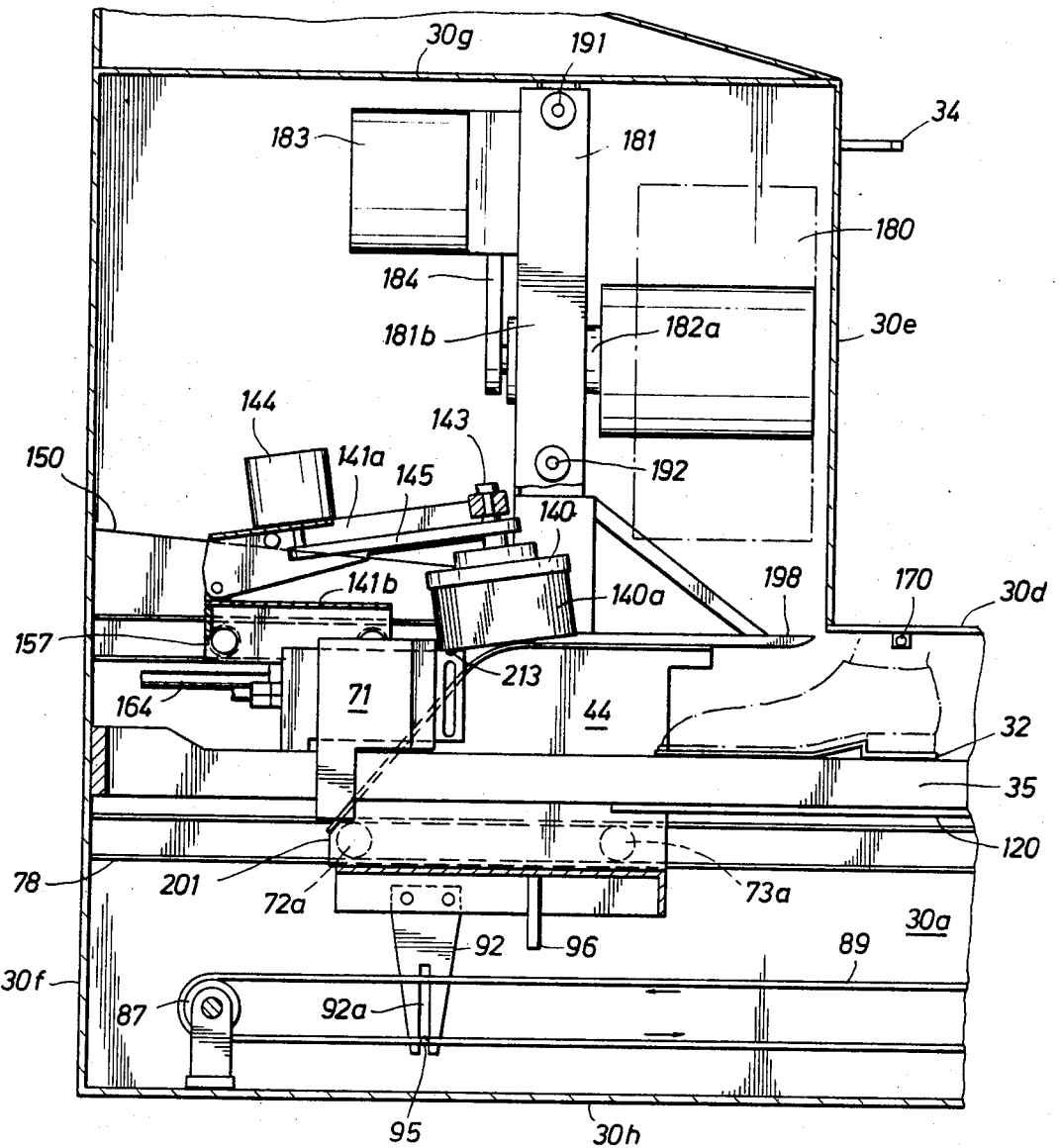
FIG. 5 is a sectional view taken along line 5—5 of FIG. 9 with the toe polish applicator brush moved into position to pick up polish from the polish supply means.
Figure 13:
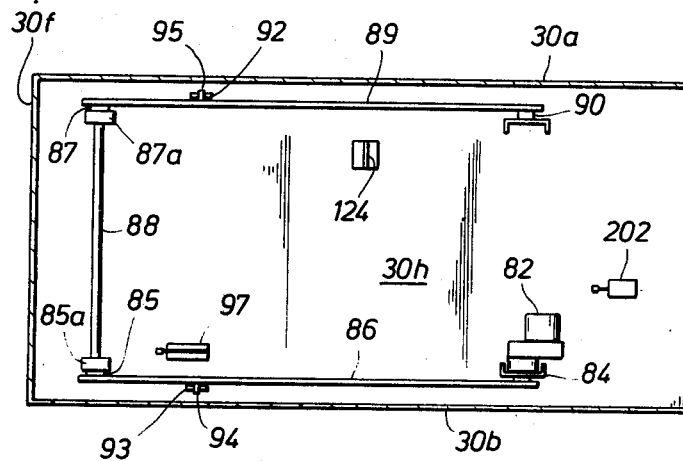
FIG. 13 is a sectional view taken along line 13—13 of FIG. 2, showing only the apparatus for moving the brushes for shining the side of a shoe.
Figure 10:
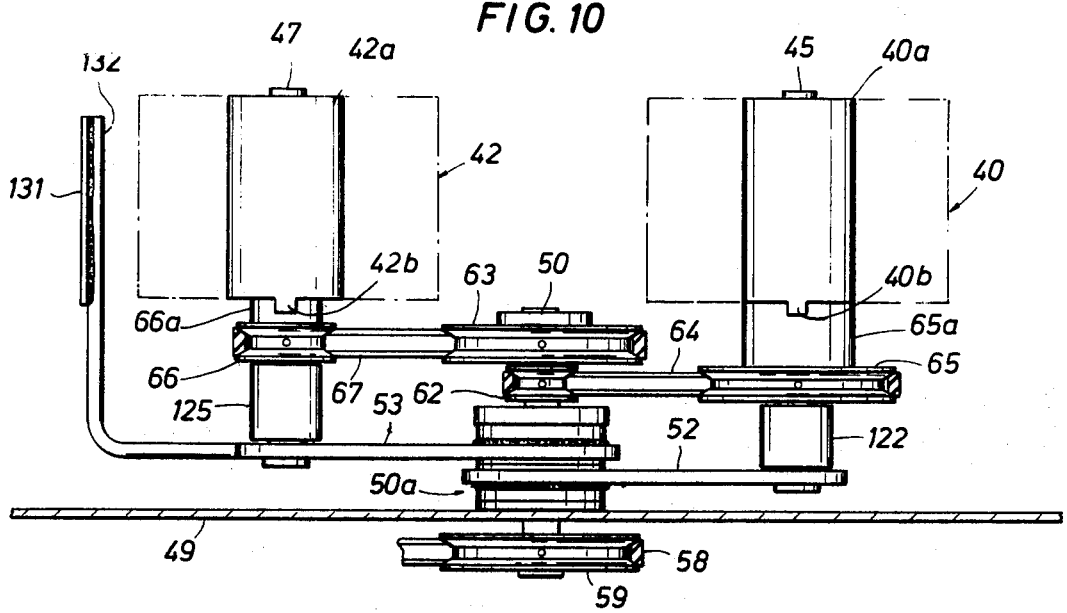
FIG. 10 is a view taken along lines 10—10 of FIG. 3.

As shown in FIGS. 2 and 13, motor 82 is mounted on bottom 30h of the housing. Motor 82 drives sprocket wheel 84, which drives chain 86 around the wheel and around sprocket wheel 85. Sprocket wheels 85 and 87 are mounted for rotation with shaft 88, which is mounted for rotation by bearing assemblies 85a and 87a on bottom 30h of the housing. Sprocket wheel 87 drives chain 89 around itself and idler sprocket wheel 90. All of the sprockets have the same diameter; therefore, rotation of sprocket 84 by motor 82 causes chains 86 and 89 to move in the same direction and at the same speed. Drive members 92 and 93 (FIG. 9) are attached to opposite sides of carriage bed 49 of carriage 44 and extend downwardly therefrom alongside chains 86 and 89, respectively. Drive pins 94 and 95 are attached to chains 86 and 89, respectively, and engage elongated slots in the drive members to move the side carriage with the chains. For example, as shown in FIG. 5, pin 95 engages slot 92a in member 92 and will carry the member with the chain back and forth between the sprockets as the chain is moved around the sprockets.

From the starting position shown in FIG. 2, motor 82 is actuated and drives chains 86 and 89 counterclockwise so that the side carriage first moves rearwardly with pins 94 and 95 on the top side of the chain drive. Then the pins go around sprockets 85 and 87 and the carriage is moved forwardly in the housing for the distance between each pair of sprockets and then rearwardly again until member 96 (FIG. 2) extending from the underside of side carriage bed or base plate 49 moves arm 97 of limit switch 98, thus turning off motor 82.

Means are provided for urging side applicator brushes 40 and 41 and side buffing brushes 42 and 43 into engagement with a shoe on the shoe support as side carriage 44 is moved between the front and rear of the housing. In the embodiment shown (FIG. 3), springs 101, 102, 103, and 104 are connected between carriage bed 49 and pivotally mounted arms 52, 55, 53, and 54, respectively, to urge the arms and the brushes mounted thereon toward each other and toward a shoe passing between the brushes.

Latch means are also provided to hold the applicator brushes in a retracted position. In the starting position for the side brushes shown in FIG. 3, both the side applicator brushes and the side buffing brushes are in their retracted position. Side applicator brushes 40 and 41 are maintained in the retracted position by latch means that includes hooks 105 and 106, respectively. The hooks are pivotally mounted to side carriage bed 49, as shown in FIGS. 3 and 15. Hook 105 holds brush 40 in the retracted position by holding pin 107, which extends from arm 52, against the force of spring 101. Similarly, hook 106 maintains side applicator brush 41 in a retracted position by holding pin 108, which extends from arm 55, against the force of spring 107 urging brush 41.

Side buffing brushes 42 and 43 are maintained in a retracted position by latch means that includes hook 109, which is pivotally mounted to the underside of carriage bed 49 (FIG. 14). Hook 109 maintains butterfly cam 112 in the position shown in FIG. 3 by holding arm 110, which is attached to shaft 111. Shaft 111 is mounted for rotation on side carriage 44 by sleeve 111a and is attached to and supports butterfly cam 112 for rotation. Thus, in the position of FIG. 3, edge 113 of the butterfly cam engages L-shaped member 114, which is attached to arm 54, and holds arm 54 and side buffing brush 43 retracted from the center of the housing against the force of spring 104. Similarly, edge 115 of butterfly cam 112 engages roller 116 attached to arm 53 and holds arm 53 and side buffing brush 42 retracted from the center of the housing against the force of spring 103.

As side carriage 44 is moved rearwardly after motor 82 has been actuated, side applicator brushes 40 and 41 are released from the retracted position. In the preferred embodiment of this invention, the side applicator brushes are released by studs 117 and 118 (FIG. 4) that extend horizontally from back wall 30f. The ends of studs 117 and 118 engage the inclined ends of hooks 105 and 106, as the side carriage moves rearwardly causing the hooks to pivot and release pins 107 and 108. (See FIG. 15 where hooks 105 and stud 118 are shown.) Upon release, brushes 40 and 41 are moved inwardly toward each other by springs 101 and 102. In this position, the side polish applicator brushes rotatingly pick up polish from polish supply means 71 as the chain driven carriage changes directions and begins movement forwardly toward the shoe. As the side carriage continues to move forwardly, side polish applicating brushes 40 and 41 apply polish to opposite sides of shoe 33 resting on shoe support 32.

Means are provided to limit the distance the side brushes can be moved toward each other by the springs at a given position of brushes. In the embodiment shown, template 120 is mounted below the shoe support on the underside of center beam 35 (FIG. 7). Template 120 is a flat plate that is generally oval in shape in the plan view. Its outer edge 121 extends beyond the shoe support on all sides. The template is mounted on center beam 35 so its edge 121 will engage sleeve 122, which is mounted for rotation on shaft 45 below brush 40, and limit the distance spring 101 can move arm 52 toward the shoe support. A similar sleeve (not shown) is also mounted on shaft 46 of side applicator brush 43 and engages the other side of outer surface 121 of the template. Generally, the shoe itself will limit the inward travel of the brushes as they travel along the side of the shoe. The main purpose of the template is to prevent brushes 40 and 41 from interfering with each other as they approach the toe of the shoe and as they leave the heel of the shoe. It also keeps the brushes apart when polishing a small shoe.

Before the side buffing brushes move along the sides of the shoe, they must be released from their retracted position. Therefore, means are provided for releasing the latch means holding the side buffing brushes retracted as the moving means moves the side buffing brushes forwardly in the housing toward the toe of the shoe. In the embodiment shown, stud 124 is mounted on housing bottom 30h in position, as shown in FIGS. 13 and 14, such that the inclined front end of pivotal hook 109 will engage stud 124 as side carriage 44 is moved forwardly toward shoe support 32, pivot the arm upwardly, and release arm 110 from the hook. Upon release of arm 110, springs 103 and 104 move buffing brushes 42 and 43 toward the center of the housing where the shoe is mounted on the shoe support. In this manner, side buffing brushes 42 and 43 are released from their retracted position and moved into engagement with the shoe. Sleeve 125 is mounted for rotation on shaft 47 above pivoting arm 53 and engages camming edge 113 of the template if brush 42 is not kept away from contact with brush 43 by the shoe itself. Similarly, a sleeve (not shown) is mounted on the shaft 48, which supports side buffing brush 43 for rotation, and engages camming edge 121, if the shoe is small, such that the buffing brushes will be limited in their travel toward each other.

After the side applicator brushes have traveled far enough along the sides of the shoe support to have applied polish to the heel of the shoe, means move side applicator brushes 40 and 41 to the retracted position. The means moving side applicator brushes 40 and 41 to a retracted position away from a position of contact with the shoe includes spring-mounted rods 133 and 134 (FIG. 7) that are slidably mounted on bed 49 of the side carriage in sleeves 133a and 134a. Coil springs 135 and 136 are mounted on rods 133 and 134, respectively, such that rod ends 137a and 138a are continuously urged toward a position adjacent sleeves 133a and 134a. As side carriage 44 approaches the end of its movement toward front housing wall 30c, after the side applicator brushes have passed the heel of the shoe, rods 133 and 134 engage stops 137 and 138, respectively, on front housing wall 30c. As the side carriage continues forwardly, rods 133 and 134 are held stationary, thus causing ends 137a and 138a of the rods to engage and rotate pins 107 and 108 until the pins are caught under hooks 105 and 106. After the carriage has changed directions and is moving rearwardly, rods 133 and 134 are gradually returned to the positions shown in FIG. 8 under the forces of the springs mounted on the rods. By retracting only the side applicator brushes, buffing brushes 42 and 43 continue buffing the sides of the shoe as they return to the starting point, and the polish given to the sides of the shoe on the support by the side buffing brushes during their forward trip is not marred by the application of additional shoe polish by the returning applicator brushes.

After the side buffing brushes have moved rearwardly past the toe of the shoe and have buffed the shoe sides for the second time, means are provided to place the side buffing brushes in a retracted position such that the buffing brushes will not contact the polish supplier when the buffing brushes move past the polish supplier during the next cycle. The buffing brushes are retracted as the side carriage moves rearwardly in the housing to the starting point shown in FIG. 3 where the carriage stops after hitting arm 97 of limit switch 98. As mentioned earlier, the side buffing brushes are retracted away from the center of the housing by the rotation of butterfly cam 112. The butterfly cam is rotated clockwise from the position shown in FIG. 7 to the position shown in FIG. 3 by the rolling engagement of roller 126, which is mounted on the butterfly cam against edge 127 of cam plate 128 (FIG. 3). The cam plate is mounted on the underside of center beam 35. When camming plate 128 has rotated butterfly cam 112 to the position shown in FIG. 4, arm 110 is caught by pivotal hook 109 and buffing brushes 42 and 43 are again latched in the retracted position.

Side applicator brush 40 actually engages the side of the toe of the shoe before applicator brush 41 as side carriage 44 moves forwardly from the polish supplier to the toe of the shoe. The force of spring 101 urging side applicator brush 40 toward the side of the shoe may cause the shoe being polished to be moved off of the shoe support toward side applicator brush 41. In order to insure that the shoe is not moved too far into the path of brush 41, retention plate 129 (FIG. 7) is mounted by L-shaped rod 130 to arm 55 of side applicator brush 41. The plate engages the toe of the shoe about the time brush 40 does and tends to equalize the lateral forces on the shoe. When brush 41 contacts the shoe toe, the forces of brushes 40 and 41 tend to cancel each other out and the shoe remains firmly on the shoe support. Another retention plate 131 (FIGS. 7 and 10) is mounted by L-shaped rod 132 on arm 53 that supports buffing brush 42. Buffing brush 43 contacts the shoe before buffing brush 42 as the side carriage is moved rearwardly from the front of the housing toward the shoe and tends to force the heel toward buffing brush 42. The retention plate is positioned to engage the heel and equalize the forces on the shoe until brush 42 can come into contact with the shoe.

In accordance with this invention, a brush is provided for applying polish to the toe of a shoe and a brush is provided to buff the toe. In the embodiment shown in FIGS. 2, 5, 6, 7, and 9, the toe applicator brush is brush 140. Means are provided for mounting toe applicator brush 140 for rotation. In the embodiment shown, second or toe applicator brush carriage 141 includes first carriage section 141a and second carriage section 141b. The two sections are pivotally attached to each other by hinge pins 142a and 142b. The toe applicator brush is attached to shaft 143 which is mounted for rotation adjacent the free end of first toe applicator carriage section 141a. Motor 144 is mounted on first carriage section 141 and drives shaft 143 and toe applicator brush 140 by means of belt 145.

Means are provided for moving toe applicator brush 140 from the retracted position of FIG. 2 at the rear of the housing to a position for applying polish across the shoe toe, as shown in FIG. 6. The moving means includes means mounting the toe applicator brush carriage for the desired movement. First toe applicator carriage section 141a has rods 146 and 147 extending outwardly from opposite sides 148 and 149 thereof. The rods engage the top surface of plates 150 and 151 mounted on opposite sides of the housing. The top surfaces of the plates through rods 146 and 147 support the section of the carriage that supports brush 140. The top surfaces of the plates are inclined such that toe applicator brush 140 is first lowered into contact with polish supply means 71 and then lowered into contact with the shoe toe as the brush is moved forwardly from rear wall 30f into contact with the toe of the shoe. Second toe applicator carriage section 142 is supported for movement relative to the housing by a pair of rollers on each side. Two rollers (only roller 154 is shown in FIG. 9) are attached to side 156 of the second section and roll along track 155 attached to housing wall 30b. Rollers 157 and 158 are mounted on side 159 of second carriage section 142 for movement along track 160.

The means moving both sections of the toe applicator carriage further include means urging the carriage sections toward a position at the rear of the housing. As shown in FIGS. 2, 6, and 9, the urging means includes sleeves 161 and 162 attached to the bottom of sides 156 and 159, respectively, of second toe carriage section 141b. Sleeve 161 fits over and is slidable along rod 163, which is mounted on housing wall 30b, and sleeve 162 slides along rod 164 mounted on housing wall 30a. Spring 165 is mounted on rod 164 and is compressed by sleeve 162 against stop 166 as second carriage section 142 is moved forwardly in the housing. Similarly, sleeve 161 compresses a spring (not shown) mounted over rod 163 as the second section is moved toward the shoe support. In this manner, the springs, when compressed, urge side applicator brush 140 toward the rear of the housing.

To move the toe applicator brush forwardly, latch means are provided to releasably connect the second or toe applicator brush carriage to the side brush carriage so that this carriage will move the toe applicator brush into engagement with the shoe toe as the side brushes are moved along the sides of the shoe. In the embodiment shown, latch hooks 167 are pivotally mounted on pivot pins 168 extending from sides 74 and 77 of side carriage 44. Only one such hook and pin arrangement can be seen in the drawings in FIGS. 6, 8, and 9. When the side carriage makes its initial move toward the rear of the housing, the inclined end surfaces of hooks 167 engage shafts 169 and 169a, which support roller 154 and 158 on second toe carriage section 142, and move the ends of the hooks up and over the shafts. This connects the two carriages so that the toe applicator carriage is moved forwardly with the side carriage, when it begins its movement toward the front of the housing. As explained above, this causes toe applicator brush 140 to pick up polish from the polish supply means and apply the polish across the toe of the shoe (as shown in FIG. 6).

The latch means connecting the side brush and the toe applicator brush carriage also includes means releasing the connection after the toe applicator brush has applied polish across the shoe toe and preferably before side buffing brushes 42 and 43 move into engagement with the sides of the shoe. To release hooks 167, studs 170 are positioned on the housing side walls to engage the inclined forward end of the hooks, as shown in FIG. 6, and pivot the rearward end upwardly out of contact with shafts 169 and 169a. This frees the toe aplicator carriage to return to the rear of the housing under the force of the compressed springs, such as spring 165, acting against sleeve 162.

When the toe applicator brush carriage has been moved back to the rear of the housing, the path is cleared for the release of side buffing brushes 42 and 43 and for the lowering of toe buffing brush 180. The latch means, such as hook 167, allow the movement of the toe applicator brush to be easily coordinated with the side brushes by making the position of the toe applicator brush carriage dependent upon the position of the side carriage. This is also true of the toe buffing brush.

Means mount toe buffing brush 180 for rotation. In the embodiment shown, such means includes toe buffing carriage 181 comprising vertical mounting plate 180a and flange 181a that extends around the edge of mounting plate 180a, except for a portion across the bottom. Shaft 182 extends through mounting plate 180a and is supported for rotation by bearing assembly 182a mounted on the plate. Toe buffing brush 180 is mounted on shaft 182 for rotation therewith. Motor 183 is mounted on plate 181a. Drive belt 184 connects toe brush shaft 182 and motor output shaft 185 and transmits power from the motor to rotate brush 180. The brush is rotated about a substantially horizontal axis that is generally parallel to the longitudinal axis of the shoe so that bristles 186 that extend radially from the axis of rotation of brush hub 187 will move transversely across the toe of the shoe mounted on the shoe support. Preferably, the bristles of brush 180 are long enough to insure that the entire toe of the shoe is buffed. By mounting brush 180 so the bristles move laterally across the shoe toe, the bristles move in the same direction as that of the wrinkles or creases in the leather of the shoe toe. Therefore, the bristles can get into the wrinkled portions of the toe so that a more thorough and lustrous shine is obtained.

Means are provided for moving the toe buffing brush mounting means so that the brush is moved into and out of engagement with the toe of the shoe. In the embodiment shown in FIGS. 2, 5, 6, 8, and 9, the moving means includes means mounting toe buffing carriage 181 for movement in a substantially vertical direction. Rollers 188 and 189 (FIG. 9) are mounted for rotation on flange 181a on one side of carriage 181, and rollers 191 and 192 are mounted on the flange 181b for rotation on the other side. Rollers 188 and 189 engage U-shaped track 194 attached to housing side 30a, and rollers 191 and 192 engage a similar track 195 on housing side 30b.

Sides 74 and 77 of the side brush carriage support relatively wide flanges 196 and 197 that are inclined downwardly toward the rear of the housing, as best seen in FIG. 8. Sled-like members (only member 198 being shown in FIGS. 2, 5, and 8) are attached to the bottom of the toe buffing brush carriage. Each sled member is positioned to engage one of flanges 196 and 197 and transmit the weight of the toe buffing brush carriage or third carriage to the first or side brush carriage. The sled members and the inclined surface on the side flanges are arranged to raise and lower the third carriage to lower toe buffing brush 180 into engagement with the toe of the shoe as the first or side carriage has moved the side buffing brushes past the toe and after the second carriage has moved the toe applicator brush out of the way. Thus, as the side carriage is moved forwardly from the rear of the housing toward the shoe, the third or toe buffing brush carriage is maintained in the position shown in FIG. 2 as long as surfaces 196a of the sled-like members are in engagement with the top portions of flanges 196 and 197 on the side brush carriage. As the side carriage continues forwardly to the position shown in broken lines in FIG. 8, the sled members will move down surface 196b, the inclined portion of the flanges, and the toe buffing brush 180 will be gradually lowered until the brush is sweeping across the toe of the shoe. When the side carriage changes directions and begins moving rearwardly again, flanges 196 and 197 will raise the third carriage and the toe buffing brush out of contact with the shoe toe. Therefore, the position of the toe buffing brush is dependent upon the position of the side carriage through the reliable mechanically expedient of slidably engaging camming surfaces.

Single pole, double throw switch 202 (FIG. 8) is positioned in the path of side carriage to reverse the direction of rotation of toe buffing brush 180 just about as the side carriage starts back toward the rear wall. This causes the bristles of the toe buffing brush to be moved across the shoe toe from both sides of the shoe during the buffing operation, which produces a more uniform shine.

In accordance with this invention, means are provided to supply the side applicator brushes with polish and means are provided to supply the toe applicator brush with polish. In the embodiment shown, polish supplying assembly 71 is mounted on center support beam 35 between the toe end of the shoe support and rear housing wall 30f as shown in FIG. 2. Referring to FIGS. 16 through 20, the assembly includes body 210. The body is rectangular in vertical cross section and is attached to beam 35 by mounting leg 210a so that most of the forward part of the body is spaced from the beam. The body has three open-sided elongated cavities or grooves. Cavities 211 and 212 are located on opposite sides of the body and cavity 213 extends across the top of the body. The body is located so that one of the applicator brushes will sweep one of the cavities during each cycle of the machine. As shown in FIG. 4, when the side carriage is moved rearwardly, initially applicator brushes 40 and 41 are released from their retracted position to move into position to sweep cavities 212 and 211, respectively, to pick up polish in the cavities on the bristles of the brushes to be transferred to the shoe. The body is also positioned for bristles 140a of the toe applicator brush to sweep cavity 213 as the toe applicator brush carriage is moved forwardly with the side carriage, as shown in FIG. 5.

Cover means are provided to close the cavities when not dispensing polish. In the embodiment shown, sleeve 220 is mounted over the forward portion of the body that is spaced from the supporting beam. The sleeve is movable between a first position, shown in FIGS. 16 and 19, covering cavities 211, 212, and 213 and a second position, as shown in FIGS. 17 and 20, uncovering the cavities to allow the applicator brushes to pick up polish out of the cavities.

Means are provided to move the cover between the two positions. In the embodiment shown, cover or sleeve 220 is rectangular in cross section with a rectangular opening to receive body 210. Arm 220a is integrally attached to the sleeve and extends downwardly alongside beam 35. The arm is engaged by the end of machine screw 224a that is mounted on post 224. Base plate or carriage bed 49 of the side brush carriage carries the post, and, as the side brush carriage moves rearwardly, machine screw 224a will engage arm 220a and move the sleeve with the carriage to its second position uncovering the cavities in the body. Screw 224a can be moved in or out relative to post 224 to adjust, to some extent, when the side carriage begins to move the cover from over the cavities to expose the polish therein.

The cover is returned to its first position covering the cavities by the second or toe applicator brush carriage. As shown in FIG. 6, flange 225 carried by carriage 141 engages the top of the sleeve and carries it with the carriage as the carriage is moved forward by the side carriage. As shown in FIG. 6, the toe applicator brush has been moved into engagement with the shoe and the cover has been moved over the cavities.

Means are provided for supplying polish to the cavities in the body to be picked up by the brushes. The supplying means includes means for storing a supply of polish and means for dispensing a predetermined volume of polish from the storage means each time the machine is actuated to polish one shoe. In the embodiment shown, storage container 229 includes cylinder 230 and cylinder heads 229a and 229b. Polish may be placed into the cylinder by a hand pump, such as a caulking or grease gun 231, connected to fitting 233, which, preferably, is a Zirt or Alemite type fitting. The means for dispensing a predetermined volume from the storage means includes piston 234 in cylinder 230. Threaded rod 237 is supported for rotation by bracket 238 that is attached to housing side wall 30b. Threaded nut 239 on rod 237 is held against rotation with respect to the rod by setscrew 240a in clamp 240, which is held against rotation by guide stud 241a that rides in vertical track 241 as nut 239 moves up or down rod 237. Sleeve 242 is positioned between piston 234 and nut 239 and extends over threaded rod 237. Upward movement of the nut due to rotation of the rod causes the rod to move the sleeve and the piston and displace shoe polish through opening 235 and into tubing 215.

Figure 12:
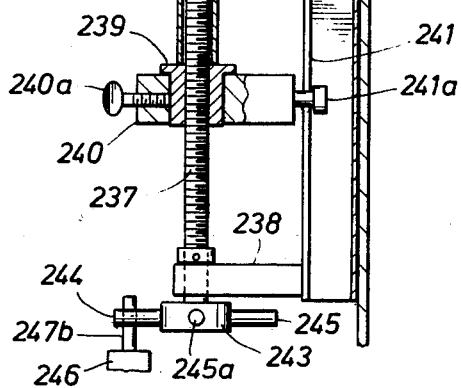
FIG. 12 is a sectional view taken along line 12—12 of FIG. 9, showing only the apparatus for actuating the polish storage mechanism.

Means are provided to actuate the dispensing means each time the machine is actuated to polish a shoe. In the embodiment shown, bushing 243 is attached to the lower end of rod 237 below bracket 238. The bushing has four pins, only three, 244, 245, and 245a are shown, that extend radially from the bushing 90 degrees apart. One-way tripper 246 (FIG. 12) is mounted on rod 146 extending from side 148 of toe applicator carriage section 141 (FIG. 9). The tripper includes two discs 247 and 248 that are mounted side by side on shaft 146. Disc 248 is held against rotation relative to the shaft by setscrew 248a. Disc 247 is free to rotate within limits set by arcuate slot 248b in disc 248. Pin 247a attached to disc 247 extends into the slot and limits the rotation of disc 247 to that required to move pin 247a between shoulders 248c and 248d. Weight 249 is attached to disc 247 to urge the disc to the position shown with pin 247a against shoulder 248d. It is in this position and moving to the left, as viewed in FIG. 12, when the second carriage is being moved by the first carriage toward the front of the housing to move the toe applicator brush into engagement with the toe of the shoe. Therefore, pin 247b will engage one of the four radial pins on bushing 243, such as pin 244 as shown, and rotate the bushing and threaded rod about 90°. When the carriage moves rearwardly, pin 247b will rotate the disc counterclockwise until the pin can pass whichever pin on bushing 243 that is in the way. This action is shown dotted in FIG. 12. Weight 249 will then return pin 247a against shoulder 248d.

By rotating threaded rod 237 a known amount, here about one-fourth of a revolution each cycle, the distance that nut 239 moves can be calculated. By multiplying this distance times the area of piston 234, the volume of shoe polish transferred is determined. Preferably, this should be the amount required to replenish what was picked up by the brushes. Assuming the brushes swept the cavities clean, then the volume dispensed should equal the volume of the cavities.

Conduit means are provided to conduct the polish from the dispensing or storage means to the cavities. In the embodiment shown, tube 215 connects outlet 235 from the cylinder to passageway 214 in body 210 (FIGS. 16 — 20). The passageway extends part way through the body then forms three branches 214a, 214b, and 214c. The branches extend at right angles to the passageway with openings in both sides and the top of the body.

Cover 220 has three channels, 221, 222, and 223, positioned with their open sides facing the openings of passageway branches 214a, 214b, and 214c, respectively. The channels are arranged to connect the passageways with the cavities to allow them to be filled with polish when the cover is in the first position (FIG. 16) and to disconnect the cavities from the passageway and the polish dispensing system when the cover is in its second position (FIG. 17).

Figure 11:
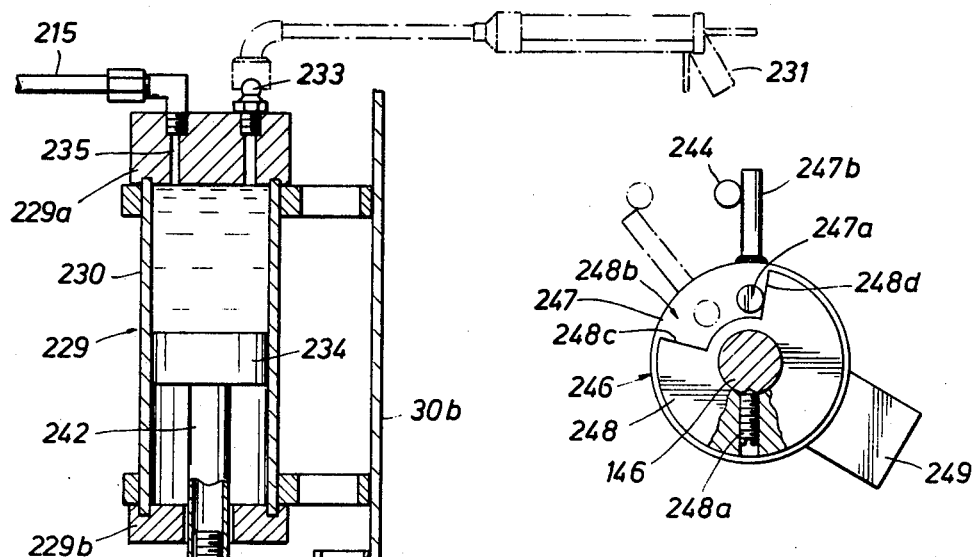
FIG. 11 is a sectional view of the polish storage mechanism of the machine of FIG. 1.

With this arrangement, the polish is pumped from cylinder 230 (FIG. 11), when cover 220 is in its second position, with the grooves that are to receive the polish uncovered. Thus, at the time the polish is displaced, it cannot get to the grooves. Usually, however, there is a sufficient amount of air in the system to allow the polish to be forced out of cylinder 230 by the compression of the air in the system. Then when cover 220 is moved back to its first position, the compressed air will force polish into grooves 211, 212, and 213. The polish is also compressible to some extent. This arrangement, although creating a momentary pressure increase in the polish dispensing system, simplifies the cover closing structure, which, as explained above, comprises flange 225 on second carriage 141.

The shoe polish used can be any desired color or colorless. It should be paste-like in order to be pumped in the manner described above. The clearance between body 210 and cover 220 should be kept to a minimum. The polish, of course, will act like a good grade of grease and tend to seal the space between the cover and the body. This results in very little drying of the paste, and practically no drying occurs in the polish in the cavities between operations of the machine. The new polish coming into the cavities each time has been well protected from the atmosphere and therefore can keep a long period of time.

This shoe polishing machine is entirely automatic and is actuated by a customer depositing one or more coins in slot 250, shown in FIG. 1. The various electrical circuitry that provides for the actuation of motors 82, 144, and 183, as well as the actual circuitry that provides the switching accomplished by limit switch 97 and reversing switch 202, is not shown. It is considered that the design of this circuitry may be accomplished by any person having ordinary skill in the art of wiring such electrical devices.

GENERAL OPERATION

An operator places his shoe on shoe support 32 and deposits sufficient coins in coin slot 250. This starts all motors of the machine. As shown in FIG. 2, chains 86 and 89, which are moved counterclockwise by motor 82, first moves side carriage 44 toward rear wall 30f of the housing. As side carriage 44 is moved rearwardly, two events occur. First, machine screw 224a engages downwardly extending member 220a of cover 220 of polish supply assembly 71 and moves the cover from its first to its second position exposing the polish-filled cavities in the body. Second, side applicator brushes 40 and 41 are released from their retracted positions by studs 117 and 118 that extend forwardly from rear wall 30f of the housing.

When released, the brushes sweep exposed cavities 211 and 212 in body 210 and pick up the polish therein as the side carriage reverses directions. During the initial rearward movement, the side carriage latches on to the toe applicator brush carriage.

As the toe applicator brush carriage is carried forwardly with the side carriage, toe applicator brush 140 is lowered into contact with polish-filled cavity 213, as shown in FIG. 5, and then into contact with the shoe toe so that polish is applied across the toe of the shoe as shown in FIG. 6. As the toe applicator brush carriage moves forwardly, it actuates the polish dispenser and builds up pressure in the polish system. At the end of the forward travel of the carriage, back plate 225 of the toe carriage has moved cover 220 to its first position and additional polish is supplied to the polish dispenser.

After polish has been applied across the toe of the shoe, hooks 167 are pivoted by contact with studs 170 causing the hooks to release their hold on roller shafts 169 and 169a. The toe carriage is now returned to its original position in the rear of the housing by springs it compressed during its forward movement.

By this time, side applicator brushes 40 and 41 have already applied polish to the front portions of the sides of the shoe. Side buffing brushes 42 and 43 are now released from their retracted position by means of stud 124 engaging pivotal hook 109. The forces of springs 103 and 104 will move the side buffing brushes toward each other and thus toward the sides of the shoe. In the released position, the side buffing brushes are in position to buff the sides of the shoe as the side carriage continues forward movement. As the side carriage continues to move forwardly in the housing, side applicator brushes 40 and 41 approach the heel of the shoe as shown in FIG. 7. At this point, the position of the side buffing brushes (not shown in this Figure) is along the sides of the toe of the shoe.

After the side applicator brushes have applied polish to the heel of the shoe, they are moved away from the center of the housing into a retracted position as explained earlier. By retracting the side applicator brushes, the side carriage may now reverse directions and begin movement rearwardly with only the side buffing brushes in position to contact the shoe. Thus, the shoe has polish applied to it as the side carriage moves forwardly in the housing and is buffed as the side carriage moves in both the forward and rearward directions. This double buffing helps to insure that no unbuffed polish is left on the shoe.

Toe buffing brush 180 is lowered into contact with the shoe toe after the side buffing brushes have moved past the sides of the shoe toe on their way toward the front. Just as side carriage 44 is closest to front housing wall 30c, the carriage actuates switch 202 that reverses the direction of rotation of the buffing brush. Therefore, as the side carriage now moves rearwardly in the housing after it has reversed its direction, the toe buffing brush is buffing the toe of the shoe in the opposite direction as it gradually rises away from the toe. In this manner, the bristles of the toe buffing brush sweep across both sides of the shoe toe as well as the top of the shoe. As the side carriage continues movement rearwardly, the toe brush is raised out of contact with the toe of the shoe by the side carriage in time to allow buffing brushes to brush the sides of the toe of the shoe without interference from the toe buffing brush. After the side buffing brushes have finished buffing the sides of the toe of the shoe, the brushes are moved to a retracted position by the rotation of butterfly cam 112. The side carriage then continues movement rearwardly until stud 96 actuates limit switch 98 causing all the power to be shut off. This completes one cycle of the machine.

From the foregoing, it can be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An automatic shoe polishing machine, comprising a housing having an opening therein, a shoe support located in the housing to support a shoe inserted into the housing through the opening, a pair of side applicator brushes for applying shoe polish to the sides of a shoe positioned on the support, a pair of side buffing brushes for buffing the sides of a shoe positioned on the support, means mounting said side brushes for rotation and in position for an applicator brush and a polishing brush to move along each side of said support as the brush mounting means is moved parallel to the shoe support from a starting position and back again, means carried by the mounting means for rotating the side brushes to cause the brushes to apply polish to and buff both sides of a shoe resting on said support as the mounting means is moved along the sides of said support, means for so moving the mounting means, means supplying polish to said side applicator brushes for application by said brushes to the sides of a shoe on said support as said side applicator brushes move from said starting position along the sides of said support, and means for moving the side applicator brushes away from the support far enough to be out of contact with a shoe thereon after the side applicator brushes have traveled far enough along the sides of said support to have applied shoe polish to the sides of a shoe on said support so that the side buffing brushes can continue buffing the sides of a shoe as the side brush mounting means is returned to the starting point, and the polish given to the sides of a shoe on the support by the side buffing brushes will not be marred by the application of additional shoe polish by the returning side applicator brushes, a toe applicator brush for applying shoe polish to and a toe buffing brush for buffing the toe of a shoe positioned on said support, means mounting the toe applicator brush for rotation, means for rotating the toe applicator brush, and means moving the toe applicator brush mounting and rotating means to move the toe applicator brush into and out of engagement with the toe of a shoe on said shoe support, means for supplying the toe applicator brush with shoe polish to be applied to the toe of said shoe, means mounting the toe buffing brush for rotation, means for moving the toe buffing brush mounting means to move the toe buffing brush into contact with the shoe toe, means for rotating the toe buffing brush to buff the toe of the shoe to which the toe applicator brush has applied shoe polish, and means for moving the toe buffing brush out of contact with the shoe toe after the shoe toe is buffed.

2. The automatic shoe polishing machine of claim 1 in which the toe buffing brush is mounted for rotation around a horizontal axis that is generally parallel to the longitudinal axis of the shoe support so the bristles of the brush will move across the toe of a shoe on the support as the brush is rotated and in which the means for rotating the toe buffing brush includes means for reversing the direction of rotation of the toe buffing brush while the brush is buffing the toe of a shoe to direct the bristles across the toe from both sides thereof during the buffing operation.

3. The machine of claim 1 in which the means supplying polish to the side applicator brushes is positioned adjacent the shoe support and the means for moving the side brush mounting means first moves the mounting means to position the brushes to pick up polish from the polish supplying means and then along the sides of the shoe support toward the back of the shoe to apply the polish to the sides of a shoe thereon.

4. The shoe polishing machine of claim 3 in which the means supplying polish to one of the side applicator brushes comprises a body having an open-sided cavity therein, means mounting the body in the machine for the side applicator brush to sweep into the cavity when it is in polish picking-up position and rotated, a cover for the cavity that is movable between a first position covering the cavity and a second position uncovering the cavity, means supplying the cavity with polish, means for moving the cover to the second position after the cavity has been supplied with polish to expose the polish in the cavity so that the side applicator brush will pick up polish from the cavity when the brush mounting means is moved to polish picking-up position, and means for moving the cover to its first position after the polish has been picked up by the side applicator brush.

5. The shoe polishing machine of claim 4 in which the means supplying the cavity with polish includes means for storing a supply of shoe polish, means for dispensing a predetermined volume of polish from the storage means each time the machine is actuated to polish one shoe, and conduit means for conducting the polish dispensed from the storage means to the cavity in the body of the polish supplying means.

6. The shoe polishing machine of claim 5 in which the conduit means includes a passageway in the body, a channel in the cover that connects the passageway to the cavity when the cover is in its first position whereby the cavity is disconnected from the passageway while it is exposed to the sweeping action of the brush so that no additional polish can enter the cavity during this operation and the polish in the channel and passageway in the body is not exposed to the air.

7. The shoe polishing machine of claim 1 in which the means supplying polish to the side and toe applicator brushes includes a body positioned adjacent the portion of the shoe support that supports the toe of the shoe, said body having three cavities therein containing shoe polish, two of the cavities being located on opposite sides of the body and one on the top of the body, a cover mounted on the body and movable between a first position covering the cavities to protect the polish in the cavities from the drying effect of the air and a second position exposing the cavities, means for moving the rotating applicator brushes by the body in position for each brush to pick up the polish in one of the cavities to be transferred by the brushes to the sides and toe of a shoe on the support, means for moving the cover to its second position exposing the polish in the cavities before the brushes are moved into position to pick up the polish, means for moving the cover to its first position, closing the cavities, after the applicator brushes have moved away from the body, and means for transferring additional shoe polish to the cavities to replenish the polish picked up by the brushes.

8. The shoe polishing machine of claim 7 in which the means for transferring polish to the cavities includes means for storing a supply of shoe polish, means for dispensing a predetermined volume of polish from the storage means each time the machine is actuated, and conduit means for conducting the polish dispensed from the storage means to the cavities.

9. The shoe polishing machine of claim 8 in which the storage means includes a cylinder for storing a supply of polish and a movable piston in the cylinder to force the polish out of the cylinder into the conduit means, and means to move the piston an incremental distance with each operation of the machine to transfer a predetermined volume of polish to the cavities.

10. The shoe polishing machine of claim 8 in which the conduit means includes three channels in the cover having the open side of the channel facing the body and position so each of the channels will be in fluid communication with one of the three cavities when the cover is in its first position and out of fluid communication with the cavities when the cover is in its second position, said channels being connected to the conduit means to receive polish dispensed from the storage means and to conduct it to the cavities.

11. The shoe polishing machine of claim 7 in which the body is rectangular in vertical cross section and the cover comprises a sleeve having an opening therein of rectangular cross section in which the body is positioned to support the sleeve for sliding movement relative to the body between its first and second positions, said opening being just large enough to allow such relative movement while providing a sufficient closure for the cavities when in its first position to keep the polish therein from drying out between operations of the machine.

12. The shoe polishing machine of claim 1 in which the side brush mounting means and the toe applicator brush mounting means includes two carriages and means for independently supporting the two carriages for horizontal movement relative to the shoe support, and in which the moving means includes means for moving the side brush carriage toward the toe applicator brush carriage, latch means for connecting the two carriages when the side brush carriage reaches a given distance from the toe applicator brush carriage to move the toe applicator brush carriage with the side brush carriage as the moving means moves the side brush carriage to move the rotating side brushes along the side of a shoe on the support and the toe applicator brush into engagement with the toe of the shoe, means for releasing the latch means to disconnect the two carriages when the toe applicator brush has moved over the toe of a shoe, and resilient means for moving the toe applicator brush carriage away from the shoe support.

13. The shoe polishing machine of claim 12 in which the toe buffing brush mounting means includes a carriage for supporting the brush and means to guide the carriage for vertical movement to move the toe buffing brush into and out of engagement with the toe of a shoe positioned on the shoe support, said side brush carriage having a cam surface for supporting the toe brush carriage that is shaped to allow the toe brush carriage to move downwardly to move the toe buffing brush into engagement with the toe of a shoe on the shoe support when the side brush carriage is moved from its starting position along the side of the shoe support and to be moved upwardly to move the toe buffing brush out of engagement with a shoe on the support as the side brush carriage moves back toward its starting position.

14. The shoe polishing machine of claim 12 in which the polish supplying means includes a body having an open-sided cavity containing polish to be picked up by an applicator brush and a cover movable between a first position covering the cavity to a second position exposing the polish, and in which the carriage for the side brushes is provided by means to engage the cover and move the cover to its first position when the carriage is moved from its starting position to uncover the cavity to allow an applicator brush to pick up polish before being moved along the side of a shoe on the shoe support to apply polish thereto.

15. The shoe polishing machine of claim 14 in which the carriage for the toe applicator brush includes means for moving the cover to its first position as the toe applicator brush carriage is moved toward the shoe support by the side brush carriage.

16. The automatic shoe polishing machine of claim 1 in which the side brush mounting means includes means mounting the brushes for lateral movement relative to the shoe support, a template having a camming edge mounted below the shoe support, and means resiliently urging the brushes into engagement with a shoe on the support as the brushes are moved along the sides of a shoe, means carried by the brush mounting means for engaging the camming edge of the template to limit the movement of the brushes toward the shoe support and hold the brushes out of engagement with each other when polishing a relatively small shoe.

17. The automatic shoe polishing machine of claim 1 in which the means supplying the side applicator brushes with shoe polish includes a polish storage container which is adapted to be refilled by a hand-operated pump.

18. An automatic shoe polishing machine comprising a housing having an opening therein, a shoe support located in the housing to receive and support a shoe thereon with the toe pointed toward the rear and the heel toward the front of the housing, a pair of side polish applicator brushes, a pair of side buffing brushes, a polish supplier located in the housing between the shoe support and the rear of the housing, means mounting the side brushes for rotation on substantially vertical axes and for movement on opposite sides of the shoe support and polish supplier as the mounting means are moved forwardly and rearwardly in the housing, means carried by the mounting means for rotating the brushes, means for moving the mounting means from a starting point between the shoe support and the polish supplier first rearwardly, then forwardly, and then rearwardly to the starting point, means urging the side polish applicator brushes into position to pick up polish from the polish supplier as the moving means moves the side brushes rearwardly from the starting position and to apply the polish to the sides of a shoe as the moving means moves the side brushes forwardly from the rear of the housing toward the front of the housing, means retracting the side applicator brushes from the polish applying position after the brushes have applied polish to the heel and before the applicator brushes move past the shoe again on the way back to the starting position, means positioning the side buffing brushes to buff the sides of the shoe as the moving means move the side buffing brushes forwardly in the housing past the shoe and rearwardly past the shoe to the starting position, means placing the side buffing brushes in position such that the buffing brushes will not contact the polish supplier when the brushes are moved rearwardly at the beginning of another cycle, as the moving means moves the buffing brushes rearwardly from the toe of the shoe to the starting point.

19. The automatic shoeshine machine of claim 18 further provided with a toe polish applicator brush, means mounting the toe applicator grush for rotation about a substantially vertical axis, means rotating the toe applicator brush, means for moving the toe applicator brush mounting means from the rear of the housing into contact with the toe of the shoe, the moving means including means urging the toe applicator brush toward the rear of the housing, means attaching the toe applicator brush to the means mounting the side brushes as the side brush moving means move the side brush mounting means forwardly toward the toe of the shoe so that the toe applicator brush rotatingly picks up polish from the polish supplier and applies polish to the shoe toe, and means releasing the attaching means after polish is applied to the shoe toe so that the toe applicator brush mounting means returns to the rear of the housing.

20. The automatic shoeshine machine of claim 19 further provided with a toe buffing brush, means mounting the toe buffing brush for rotation in a substantially horizontal axis, means rotating the toe buffing brush, means moving the toe buffing brush mounting means substantially vertically to move the buffing brush into and out of engagement with the shoe toe, said moving means including a surface on the side brush mounting means for supporting the toe brush mounting means, said surface being shaped to move the toe brush mounting means substantially vertically to move the toe brush into and out of engagement with the toe of a shoe as the side brush mounting means is moved forwardly and rearwardly of the housing.

21. An automatic shoe polishing machine comprising a shoe support, a plurality of brushes for applying polish to and buffing the sides of a shoe on the support, a brush for applying polish to the toe of a shoe and a brush for buffing the toe of a shoe, means for mounting the brushes for movement into and out of engagement with a shoe on the support, said mounting means including a first carriage for supporting the side polish applicator and buffing brushes, a second carriage for supporting the toe polish applicator brush, and a third carriage for supporting the toe buffing brush, means for moving the first carriage to move the side brushes back and forth along the sides of a shoe on the support, means supporting the second carriage for movement from a retracted position to a forward position with the toe applicator brush in engagement with the toe of a shoe, latch means for connecting the first and second carriage for the first carriage to move the second carriage to its forward position, means releasing the latch means, means for returning the second carriage to its retracted position, a surface on the first carriage and supporting the third carriage, said surface being shaped to hold the third carriage in position with the toe buffing brush out of the way of the toe applicator brush as the first carriage moves the second carriage to its forward position and for allowing the third carriage to move downwardly to move the toe buffing brush into engagement with the toe after the second carriage has moved to its retracted position.

22. An automatic shoe polishing machine comprising a housing, a shoe support carried by the housing, a pair of side applicator brushes for applying polish to the sides of a shoe positioned on the shoe support, a pair of side buffing brushes for buffing the sides of a shoe positioned on said shoe support, means mounting the side applicator and buffing brushes for rotation and for a cycle of operation during a first portion of which the side applicator and buffing brushes are moved in one direction with both in contact with a shoe on said shoe support with the side applicator brushes preceeding the buffing brushes and in a second portion of the cycle, the brushes are moved in an opposite direction with the buffing brushes in contact with the shoe on said shoe support, means for moving the side applicator brushes away from the shoe support during their movement in said opposite direction so as to be out of contact with a shoe on said shoe support whereby polish is applied to a shoe while the applicator brushes are moving in said one direction and the shoe is buffed while the buffing brushes are moving in both of said directions, means for rotating the brushes, and means supplying polish to said side applicator brushes during an initial portion of their cycle of movement prior to their contacting a shoe on said shoe support.

23. The automatic shoe polishing machine of claim 22 including a toe applicator brush for applying shoe polish to and a toe buffing brush for buffing the toe of a shoe positioned on said support, means mounting the toe applicator brush for rotation, means for rotating the toe applicator brush, and means moving the toe applicator brush mounting means to move the toe applicator brush into and out of engagement with the toe of a shoe on said shoe support, means for supplying the toe applicator brush with shoe polish to be applied to the toe of said shoe, means mounting the toe buffing brush for rotation about a horizontal axis which axis is parallel to the length of a shoe on said support, means for moving the toe buffing brush mounting means to move the toe buffing brush into contact with the shoe toe, means for rotating the toe buffing brush to buff the toe of the shoe to which the toe applicator brush had applied shoe polish, and means for moving the toe buffing brush out of contact with the shoe toe after the shoe toe is buffed.

* * * * *